C. H. CALKINS.
COMPOSITE GEAR.
APPLICATION FILED AUG. 17, 1916.
1,338,672.
Patented May 4, 1920.
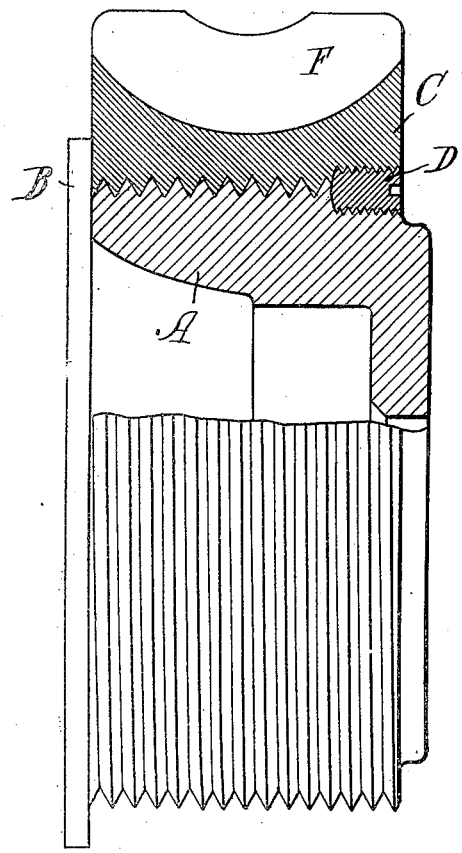
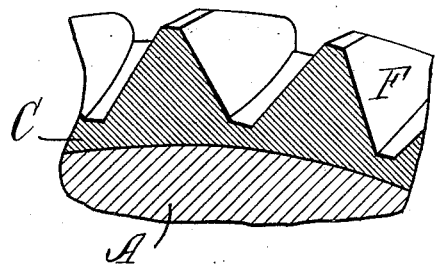
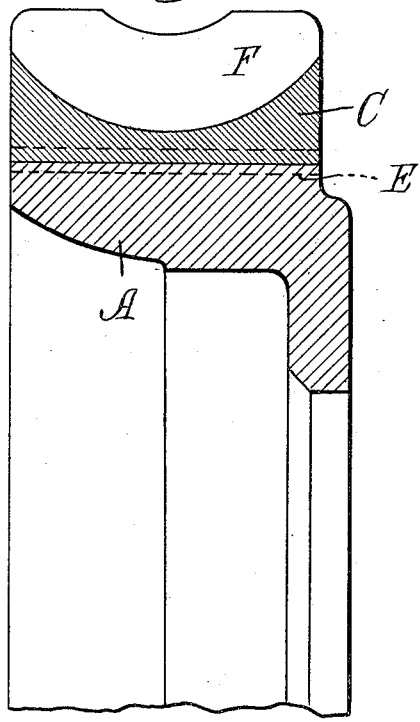
INVENTOR.
Charles H. Calkins
BY
D. Anthony Usina ATTORNEY

UNITED STATES PATENT OFFICE.

CHARLES H. CALKINS, OF LUDLOW, MASSACHUSETTS, ASSIGNOR TO BAUSH MACHINE TOOL COMPANY, A CORPORATION OF MASSACHUSETTS.

COMPOSITE GEAR.

1,338,672. Specification of Letters Patent. Patented May 4, 1920.

Original application filed March 22, 1916, Serial No. 85,809. Divided and this application filed August 17, 1916. Serial No. 115,527.

*To all whom it may concern:*

Be it known that I, CHARLES H. CALKINS, a citizen of the United States, residing in Ludlow, Massachusetts, have invented certain new and useful Improvements in Composite Gears, of which the following is a specification.

In my application Serial No. 85,809, filed March 22, 1916, I have described and claimed certain improvements applicable to gears generally and particularly advantageous in the manufacture of worm gears. The present application is a division thereof. The accompanying drawings illustrate embodiments of the invention.

Figure 1 is in part an axial section of a composite gear and in part an elevation of the center thereof.

Fig. 2 is a transverse section thereof.

Fig. 3 is an axial section through the rim of a composite gear of different construction.

Referring to the embodiments of the invention illustrated, the center A is of a comparatively strong metal such as iron, using the word in its general sense to include all varieties of iron and steel. The center (in Fig. 1) is threaded on its outer face and provided with a flange B at one side.

A ring C of material, such as bronze, weaker than the center but constituting a better anti-friction surface, is screwed on the center and hard against the flange B, which prevents further movement in the axial direction. One or more pins or keys D are then tapped into place and by engagement with the parts of the wheel prevent circumferential movement and (in combination with the screw threads) axial movement. In place of the flange B and pin D various other supplementary means may be used with like effect. In any case I prefer to shrink the bronze ring C on the center A and this, in connection with the screw threads, will hold the parts fixedly to each other.

In fact the threads may be omitted, as in Fig. 3, and the ring C and center A have plain cylindrical or slightly tapered surfaces, the ring being fitted hot onto the cold center. Upon cooling, the bronze ring will have a firm enough grip on the center for most uses. Where greater security is required one or more supplementary fastening devices may be added, such as a tapped key above described or a driven key E, which will prevent or resist circumferential movement of the bronze ring about the center.

After fastening the bronze ring on the iron center, teeth F are cut therein. Preferably the thickness of the bronze ring is greater than the depth of the teeth, so that the latter are bronze throughout, but this is not essential.

Various other modifications of the constructions illustrated may be made by those skilled in the art without departing from the invention.

What I claim is:—

1. A worm gear having a center of comparatively strong metal and a toothed ring of comparatively weak anti-friction material extending continuously around the center, said ring being formed separately and shrunk on said center to form a tight engagement therewith, and a threaded pin extending in an axial direction into and in threaded engagement with both said parts to resist relative movement thereof in both a circumferential and axial direction.

2. A worm gear having a center of cast metal and a toothed ring of comparatively weak anti-friction material extending continuously around the center, said ring being formed separately and threaded and shrunk on said center and a pin extending in an axial direction into and in threaded engagement with both of said parts to help prevent unscrewing of the ring in the use of the gear.

3. A worm gear having a center of cast iron and a toothed ring of bronze extending continuously around the center, said ring being formed separately and threaded on said center, a flange for limiting the screwing-on movement of the ring and a screw extending in an axial direction into and in threaded engagement with both said parts to prevent unscrewing of the ring in use.

4. A gear having a center of comparatively strong metal and a bronze ring extending continuously around said center and having worm teeth formed thereon screwed onto said center and a screw D to prevent relative longitudinal and circumferential movement between the center and the ring, said screw being threaded into an aperture one part of which is formed in the inner cylindrical surface of the ring C and the other part of which is formed in the outer cylindrical surface of the center A.

5. A gear having a center of cast iron and a ring of bronze extending continuously around and shrunk on said center and a screw D to prevent relative longitudinal and circumferential movement between the center and the ring, said screw being threaded into an aperture one part of which is formed in the inner cylindrical surface of the ring C and the other part of which is formed in the outer cylindrical surface of the center A.

In witness whereof, I have hereunto signed my name.

CHARLES H. CALKINS.